H. E. MARCHAND.
Atmospheric and Vacuum Egg-Beater.
No. 214,936. Patented April 29, 1879.
FIG. I.
FIG. II.
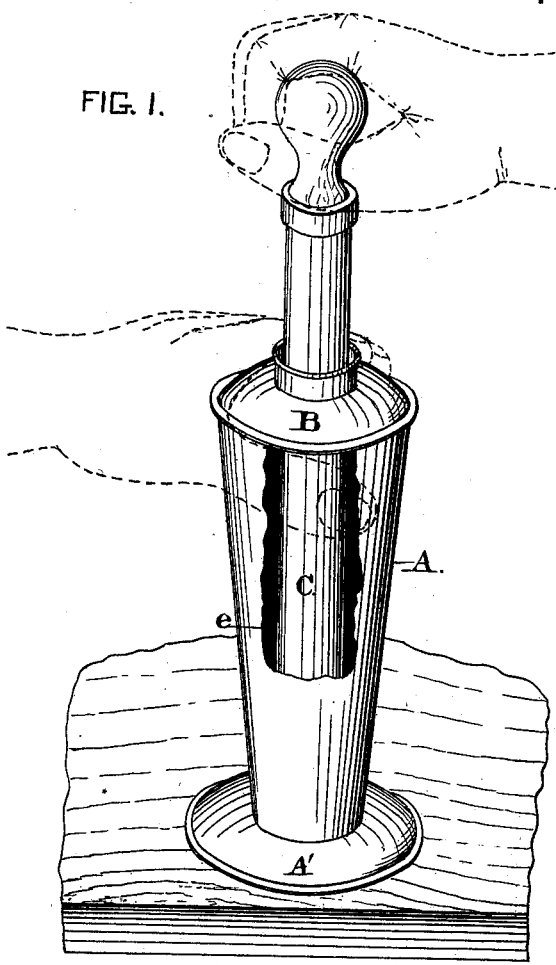
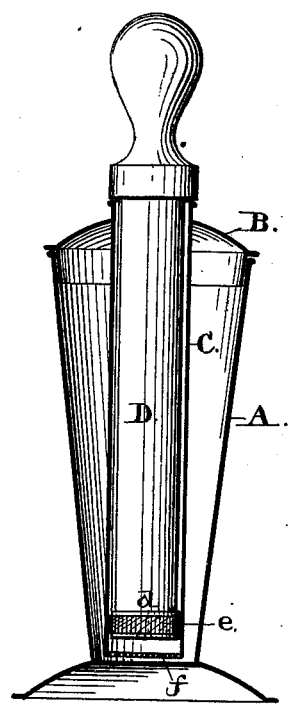
FIG. III.
FIG. IV.
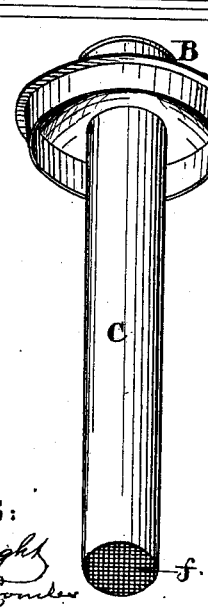
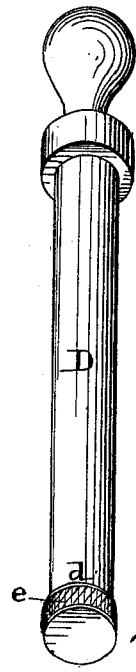
WITNESSES:
James M. Wright
Chas. L. Coombs
INVENTOR:
HENRY. E. MARCHAND,
By James L. Norris,
ATTORNEY.

UNITED STATES PATENT OFFICE.

HENRY E. MARCHAND, OF PITTSBURG, PENNSYLVANIA, ASSIGNOR OF ONE-HALF HIS RIGHT TO FRANK C. KOHNE, OF SAME PLACE.

IMPROVEMENT IN ATMOSPHERIC AND VACUUM EGG-BEATERS.

Specification forming part of Letters Patent No. 214,936, dated April 29, 1879; application filed April 7, 1879.

*To all whom it may concern:*

Be it known that I, HENRY E. MARCHAND, of Pittsburg, in the county of Allegheny and State of Pennsylvania, have invented certain new and useful Improvements in Atmospheric and Vacuum Egg-Beaters, of which the following is a specification.

The object of my invention is to provide for household use a cheap, neat, and handy egg-beater, which will be simple in construction, and will beat the eggs more rapidly and thoroughly than the egg-beaters now in use.

The egg-beaters at present in use are generally made with rotating wires or blades, which are put in motion by means of gearing, which renders them complicated and expensive in construction, and inconvenient and inefficient in operation.

By my invention these objections are wholly obviated; and it consists in an atmospheric and vacuum egg-beater constructed of a suitable cup or vessel, in combination with a removable lid or cover, from which a hollow cylinder projects downwardly into the cup or vessel, the said hollow cylinder having its lower end covered with a foraminous or reticulated screen, and a plunger or piston playing within it, as more fully hereinafter specified.

In the drawings, Figure 1 represents a perspective view of my improved egg-beater placed upon the table, the position of the hands in operating the same being shown in dotted lines, and a portion of cup or vessel being broken away to show the interior. Fig. 2 represents a vertical section of beater; Fig. 3, a detached perspective view of the lid and hollow cylinder, showing the foraminous screen at the lower end; and Fig. 4, a detached perspective view of the plunger.

The letter A indicates the cup or vessel, which may be of any desired shape, but is preferably constructed in the form of a cone, mounted upon a suitable base, A'.

The letter B indicates the lid; and C, a hollow cylinder, secured at its upper end to the lid, and projecting downward within the cup or vessel.

D is the plunger, having its lower end, $d$, bound with felt, leather, or other suitable material, $e$.

The eggs are broken and placed in the bottom of the cup or vessel A, and the parts are placed together as shown in Figs. 1 and 2 of the drawings. The plunger is then reciprocated within the cylinder C in the same manner as the piston of a pump. The upward movement of the plunger creates a vacuum in said cylinder, drawing the egg in through the foraminous or reticulated screen $f$ at its lower end, and the egg is thus finely cut up and agitated. Upon the downward movement the egg is forced out through the foraminous or reticulated screen, continuing the agitation, and so on until the whole mass is rendered as smooth and light as desired.

The cup or vessel is held by one hand while the implement is being used, the plunger being operated by the other hand, as shown in dotted lines in Fig. 1.

The lid prevents any of the contents from being forced out by the agitation of the same.

While I have contemplated using my invention mainly as an egg-beater, it is adapted for thoroughly mixing many kinds of liquids, and may be used to great advantage as a churn, the forcing of the milk or cream back and forth through the screen serving to break up the molecules or butter-sacks very effectually.

What I claim is—

An atmospheric and vacuum egg-beater, consisting of a suitable cup or vessel, in combination with a removable lid or cover, from which a hollow cylinder projects downwardly into the cup or vessel, the said hollow cylinder having its lower end covered with a foraminous or reticulated screen, and a plunger or piston playing within it, substantially as specified.

In testimony that I claim the foregoing I have hereunto set my hand in the presence of the subscribing witnesses.

HENRY E. MARCHAND.

Witnesses:
JOHN R. BINGLER,
F. KOHNE.